United States Patent [19]
Landau et al.

[11] Patent Number: 5,613,098
[45] Date of Patent: Mar. 18, 1997

[54] TESTING AND DEBUGGING NEW Y ARCHITECTURE CODE ON EXISTING X ARCHITECTURE SYSTEM BY USING AN ENVIRONMENT MANAGER TO SWITCH BETWEEN DIRECT X CODE EXECUTION AND SIMULATED Y CODE EXECUTION

[75] Inventors: Robert V. Landau, Bath; James E. Johnson, Midgham; Michael V. Iles, Basingstoke, all of England

[73] Assignee: Digital Equipment Corporation, Maynard, Mass.

[21] Appl. No.: 405,579

[22] Filed: Mar. 16, 1995

Related U.S. Application Data

[63] Continuation of Ser. No. 207,897, Mar. 7, 1994, abandoned, which is a continuation of Ser. No. 665,886, Mar. 7, 1991, abandoned.

[51] Int. Cl.$^6$ .................................................. G06F 11/00
[52] U.S. Cl. ........................................ 395/500; 395/183.14
[58] Field of Search ............................ 395/500, 183.13, 395/183.14; 371/19, 23

[56] References Cited

PUBLICATIONS

Yourdon, Edward, "Techniques of Program Structure and Design," 1975, pp. 54–74 and 93–100.
Dennis, Jack B., Modularity, Published in "Software Engineering, An Advanced Course," F. L. Bauer Editor, 1977, pp. 128–137.
Aron, Joel D., "The Program Development Process," 1974, pp. 96–100.
Ulrickson, Robert W., Solve Software Problems Step By Step, Published in "Microprocessor Software Design," Max J. Schinler Editor, 1980, pp. 26–35.
Cocking et al., "Software Device Simulator," IBM Technical Disclosure Bulletin, vol. 15, No. 9, Feb. 1973.
Collett, Ron, "RISC Chips Gain Needed Support Tools," ESD: The Electronic System Design Magazine, vol. 19, No. 3, Mar. 1989.

Kopetzky, Daniel J., "Horse: A Simulation of the Horizon SuperComputer," Proceedings. Supercomputing '88, Nov. 1988.
Markowitz, Michael C., "Software–Modeling Capability Allows You to 'Emulate' Your System Designs," EDN, vol. 34, No. 8, p. 128, Apr. 13, 1989.
Patch, Kimberly, "Simulator Eases Program Design Of 80386 on VAX," Digital Review, vol. 6, No. 35, Sep. 4, 1989, p. 27.
Weiss, Ray, "Sun Simulator Rows," Electronic Engineering Times, No. 511, Nov. 7, 1988, p. 63.
Wilkinson et al., "Inside Atari Dos," Compute! Books, Feb 1982, p. IV–VIII.

*Primary Examiner*—Richard L. Ellis
*Attorney, Agent, or Firm*—David A. Dagg; Denis G. Maloney; Arthur W. Fisher

[57] ABSTRACT

A process is provided for developing a new computer system based on a new (Y) architecture. A Y computer prototype is developed with a design in accordance with the Y architecture.

A multi-code processing system is developed for use on an existing X computer system designed in accordance with an X architecture and having an operative X operating system and operative X support routines. The processing system includes a Y simulator component, a debugger component, and an environment manager component. A Y code module is developed for each of a plurality of predetermined Y program modules during the Y prototype development.

The multi-code processing system and at least one of the Y code modules are loaded into the X computer system during the Y prototype development. A related X code module may also be processed for loading into the X computer at the same time.

The multi-code processing system components are operated on the X computer system during the prototype development to control and interface the switching of code execution between the X and Y domains and to test and debug each of the Y code modules. The debugged Y code modules are executed on the Y prototype or other Y computer system unit after the Y prototype is developed.

16 Claims, 6 Drawing Sheets

TESTING AND DEBUGGING NEW Y ARCHITECTURE CODE ON EXISTING X ARCHITECTURE SYSTEM BY USING AN ENVIRONMENT MANAGER TO SWITCH BETWEEN DIRECT X CODE EXECUTION AND SIMULATED Y CODE EXECUTION

CROSS REFERENCE TO RELATED APPLICATIONS

SYSTEM FOR DEVELOPING AND TESTING COMPUTER SYSTEMS USING A MULTI-CODE PROCESSING SYSTEM HAVING A SIMULATOR PROGRAM AND ENVIRONMENT MANAGER PROGRAM TO SWITCH CONTROL BETWEEN THE SIMULATOR PROGRAM AND THE UNDERLYING COMPUTER SYSTEM.

This application is a continuation of application Ser. No. 08/207,897, filed Mar. 7, 1994, now abandoned, which is a continuation of application Ser. No. 07/665,886, filed Mar. 7, 1991, now abandoned.

Reference is made to the following concurrently filed patent applications assigned to the present assignee and hereby incorporated by reference:

Ser. No. 07/666,039, filed Mar. 7, 1991, now abandoned, entitled IMPROVED SYSTEM AND METHOD FOR EXECUTING MULTIPLE CODES IN A MULTI-ARCHITECTURE ENVIRONMENT WITH CODE DEBUGGING CAPABILITY and filed by Mark A. Herdeg, James A. Wooldridge, Scott G. Robinson, Ronald F. Brender and Michael V. Iles.

Ser. No. 07/666,028, filed Mar. 7, 1991, now abandoned, entitled SYSTEM AND METHOD FOR AUTOMATICALLY INTERFACING CALL CONVENTIONS BETWEEN TWO DISSIMILAR PROGRAM UNITS and filed by Daniel L. Murphy.

Ser. No. 07/665,888, filed Mar. 7, 1991, now U.S. Pat. No. 5,548,717, entitled IMPROVED SOFTWARE DEBUGGING SYSTEM AND METHOD ESPECIALLY ADAPTED FOR CODE DEBUGGING WITHIN A MULTI-ARCHITECTURE ENVIRONMENT and filed by James A. Wooldridge, Ronald F. Brender and Henry N. Grieb, III.

Ser. No. 07/666,022, filed Mar. 7, 1991, now abandoned, entitled IMPROVED SIMULATOR SYSTEM AND METHOD ESPECIALLY ADAPTED FOR CODE EXECUTION IN A MULTI-CODE EXECUTION AND DEBUGGING SYSTEM WITHIN A MULTI-ARCHITECTURE ENVIRONMENT and filed by Mark A. Herdeg and Michael V. Iles.

Ser. No. 07/666,072, filed Mar. 7, 1991, now abandoned entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT and filed by Mark A. Herdeg, Scott G. Robinson, Ronald F. Brender and Michael V. Iles.

Ser. No. 07/665,752, filed Mar. 7, 1991, now U.S. Pat. No. 5,339,422, entitled IMPROVED SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT and filed by Ronald F. Brender and Michael V. Iles.

Reference is also made to the following concurrently filed patent applications assigned to the present assignee:

Ser. No. 07/666,071, filed mar. 7, 1991, now abandoned, entitled IMPROVED SYSTEM AND METHOD FOR PRESERVING INSTRUCTION STATE-ATOMICITY FOR TRANSLATED PROGRAM CODE and filed by Scott G. Robinson, Richard Sites and Richard Witek.

Ser. No. 07/666,025, filed Mar. 7, 1991, now U.S. Pat. No. 5,307,504, which is hereby incorporated by reference and which is entitled IMPROVED SYSTEM AND METHOD FOR PRESERVING INSTRUCTION GRANULARITY FOR TRANSLATED PROGRAM CODE and filed by Scott G. Robinson and Richard Sites.

BACKGROUND OF THE INVENTION

The present invention relates to methods for developing new computer systems and, more particularly, to methods for speeding the development of such systems through the use of better software development and testing procedures.

A large amount of development effort and monetary investment is required to design a new computer hardware architecture, develop a commercial computer product implementing the new architecture, and develop system and user software for use on the new computer product. As the time to develop new computer hardware and software increases, both the product investment cost and the product marketability may be adversely affected. Thus, greater commercial product development time usually requires more monetary investment by the manufacturer and its suppliers and users and, further, runs greater risk that anticipated market needs and other market conditions will have eroded before the new product is commercially available. Accordingly, it is desirable and beneficial to suppliers, manufacturers and users for economic and other reasons that the total hardware/software development time cycle be shortened.

More particularly, the development of new computer systems has been a slow and lengthy process because of the many layers of components involved. For example, the operating system cannot be completed until the hardware is available; compilers and run-time libraries cannot be completed until the operating system is available; applications cannot be completed until the compilers and run-time libraries are available. In practice, each "layer" itself contains components having interdependencies among themselves and with components in other layers.

If development and testing of each component waits until all of the other components upon which it depends are completed, the total development time for the whole system can easily become intolerably long. Various techniques have accordingly been devised to speed the development process, but the results have been very limited.

One common technique for speeding system development employs cross-tools on an existing computer system. Such tools include cross-compilers and cross-linkers.

A cross-compiler executes on one kind of computer system and generates code for another kind of computer system. Ideally, the object file output of the cross-compiler is in the form that ultimately will be produced by a corresponding compiler on the new computer system. A cross-assembler is a particular kind of cross-compiler for a language that is closely related to another kind of computer system.

Similarly, a cross-linker combines object files from one or more cross-compilers and transforms them into a form required for loading and execution on another kind of system.

Cross-compiling and cross-linking have value since they permit the source code for programs intended for execution on the new computer system to be prepared, compiled and linked. The compilation and linking steps can detect many kinds of errors that can be corrected without recourse to the new system hardware and other components therefor.

However, many other kinds of errors cannot be detected by cross-compiling and cross-linking procedures. A more complete check of new software requires execution of that software.

Simulation of new hardware is a common technique for checking the design of new computer system hardware as well as for checking programs that will ultimately execute on that hardware. A "whole machine" simulator is usually employed for software development and checkout. In a whole machine simulator, the behavior of a complete machine is emulated including all or nearly all of its instructions, some amount of memory, and a small number of input/output devices.

Whole machine simulators are useful for early development and checkout of an operating system. In this application of the simulator, the operating system typically depends on precise details of the behavior of the new system hardware. Further, the relevant parts of the operating system are relatively limited and self-contained.

While simulation procedures provide some satisfaction for operating system development checkout, they are far less satisfactory for higher software levels. Thus, user programs or other software above the operating system level depend on a greater variety of run-time components and capabilities. As a result, higher level components may not be testable until lower level components are available.

If lower level components are available, the execution time needed to simulate the code therefor can easily exceed the execution time needed to simulate the particular code that a programmer wants to test. Further, such lower level components themselves are new and usually not thoroughly exercised. For this reason, many apparent problems in a component under test will turn out to be due to a problem in some other component. Conversely, distrust of other components will often draw attention away from the immediate component where some problems will actually occur.

In some cases, it is possible to reduce these problems by extending the simulator to include built-in emulation of certain lower level components, perhaps even the majority of the frequently used parts of an entire operating system. Some improvement may be achieved in this manner, but it involves another heavy development expenditure for a new subsystem that will have yet another set of limitations and problems.

It is accordingly desirable that a new and basically different process be conceived and actualized to provide significantly faster, more efficient and more economic development of new computer systems including software components therefor. The present invention is directed to this end.

SUMMARY OF THE INVENTION

A process is provided for developing a new computer system based on a new (Y) architecture. A Y computer prototype is developed with a design in accordance with the Y architecture.

A multi-code processing system is developed for use on an existing X computer system designed in accordance with an X architecture and having an operative X operating system and operative X support routines. A Y code module is developed for each of a plurality of predetermined Y program modules during the Y prototype development.

The multi-code processing system and at least one of the Y code modules are loaded into the X computer system during the Y prototype development. A related X code module may also be processed for loading into the X computer at the same time.

The multi-code processing system is operated on the X computer system during the prototype development to test and debug each of the Y code modules. The debugged Y code modules are executed on the Y prototype or other Y computer system unit after the Y prototype is developed.

BRIEF DESCRIPTION OF THE DRAWINGS

The accompanying drawings, which are incorporated in and constitute a part of this specification illustrate one embodiment of the invention and, together with the description, provide an explanation of the objects, advantages and principles of the invention. In the drawings.

DESCRIPTION OF THE PREFERRED EMBODIMENT

Figure 1:
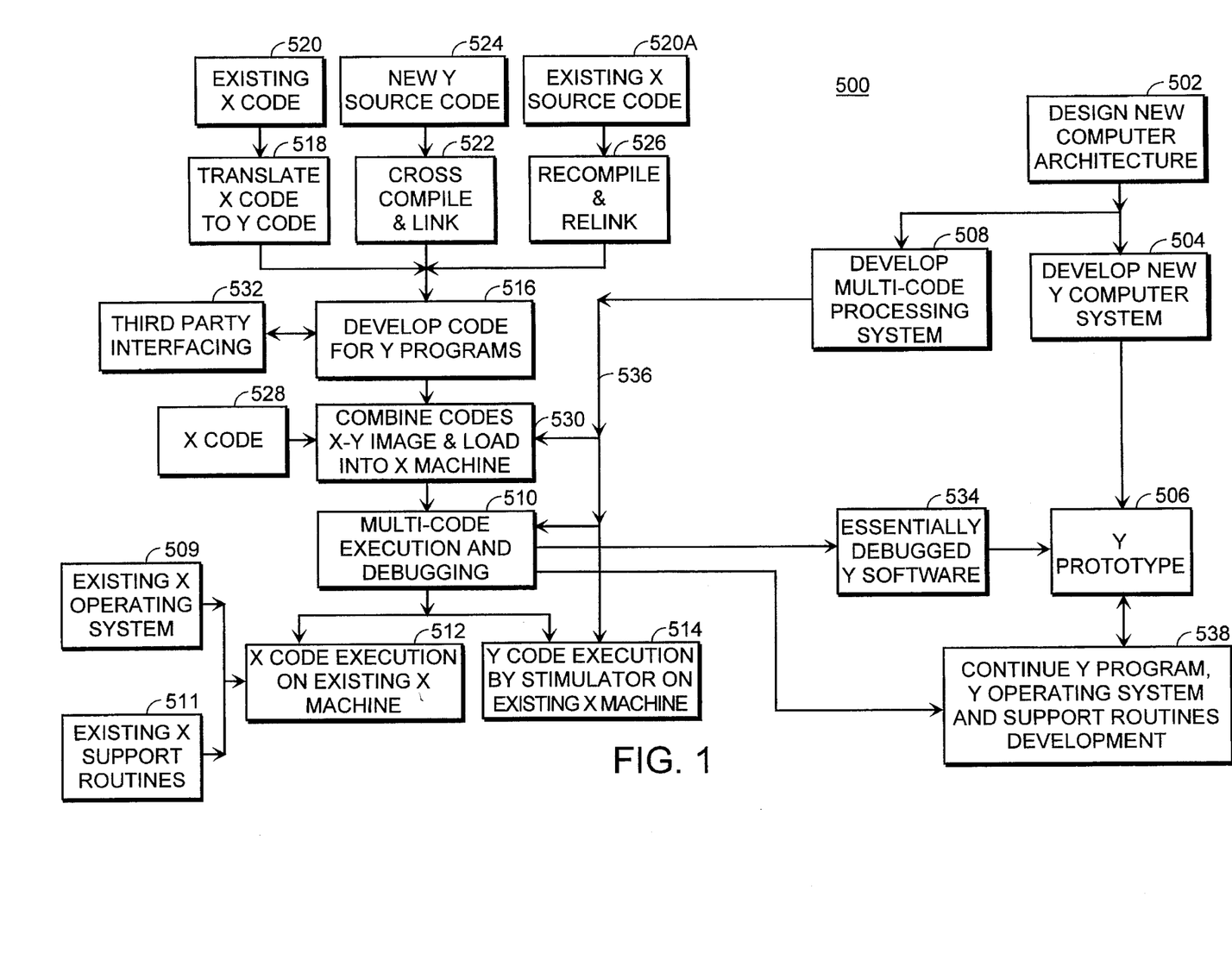
FIG. 1 shows a flow diagram representing a new process for developing new computer systems employing better software development and testing procedures in accordance with the present invention.

There is shown in FIG. 1 a process 500 for developing new computer systems in accordance with the present invention. The process 500 employs better software development and testing procedures and significantly speeds up the development time for new computer systems as compared to conventional procedures.

Figure 2:
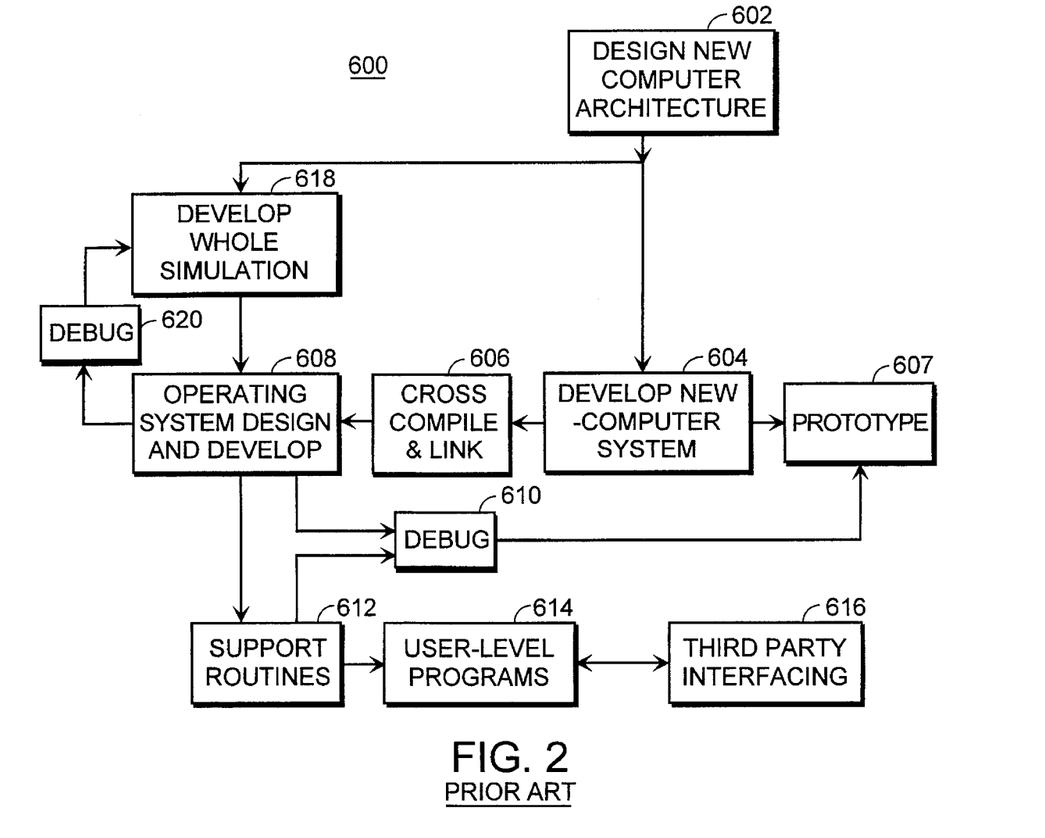
FIG. 2 shows a flow diagram representing typical prior art procedures for developing new computer systems.

A typical prior art process 600 for developing new computer systems is shown in FIG. 2. First, a new computer architecture is designed as indicated by block 602. Next, a new computer system is developed as indicated by block 604 as permitted by the development of the architecture design.

As the computer system is developed, cross-compiling and cross-linking may be employed, as indicated by block 606, in the development of an operating system 608 that has been designed for the new computer system. When a prototype 607 has been completed, typically within two to three years after the architecture design, continued development and debugging of the operating system 608 may proceed as indicated by the reference character 610.

After the operating system reaches an operational status, development of a library of support routines 612 can be completed and thereafter undergo debugging as indicated by the block 610. Finally, final development of user-level programs may be undertaken.

At this point in the prior art process, a significant time burden is incurred because interfacing indicated by block 616 must be provided for suppliers, customers, other groups within the same organization, and other third parties as required. The final step in the development of user-level programs employs a debugger as indicated by the block 610 to correct program errors and produce a proven, operational product.

The prior art process as thus far described involves a high degree of sequential execution in the performance of the process steps. Some time overlap may exist between any one step and the next step, but in essence, the prior art process is a sequential one involving sequential dependencies between steps. Generally, each step requires completion of the prior step before significant parts of the current step can be completed. As a result, substantial time is required for the whole computer system development process to be completed with commercial and other disadvantages as previously described herein.

To a limited extent, system development time has been saved in the prior art through use of some parallel development enabled by use of a "whole simulator". Thus, as indicated by block 618, a whole simulator can be developed to advance the design and development of the operating system 608. The simulator 618 may be used to debug the operating system as indicated by block 620. Final debugging 610 is done when the prototype 607 becomes available. However, the simulator 618 provides very limited speedup in the development of software that operates at levels above the operating system level.

NEW COMPUTER SYSTEM DEVELOPMENT PROCESS

With reference again to FIG. 1, the computer system development process 500 starts with the design of a new computer architecture Y as indicated by block 502. Design development of a new Y computer system based on the Y architecture then proceeds as indicated by block 504 until a Y prototype 506 is produced.

Software development is performed in parallel with the computer system development and can be completed before the Y prototype 506 becomes available. To enable development of Y programs at any software level in the absence of Y computer hardware 506, a multi-code processing system is designed and developed, as indicated by block 508 as permitted with development of the new computer architecture. The multi-code processing system includes a Y hardware simulator and a software system for controlling multi-code execution and debugging. An operating system for the Y prototype 506 may be developed with or without use of the multi-code processing system.

The developed multi-code processing system is designed in the preferred embodiment to process two codes. Y code being developed for the new Y computer system, and X code for an existing X computer system for which a proven operating system 509 and proven library or support routines 511 exist. When development and testing of the multi-code processing system are completed, a reliable capability is provided for executing X code within the native architecture of an existing X machine 512 and for executing Y code by the Y simulator on the same X machine as indicated by block 514. Control of mixed code execution and debugging is provided as indicated by block 510.

To make use of the software development capability of the multi-code processing system, code is developed for Y programs as indicated by block 516. The developed Y code at the user level may arise from translating 518 or otherwise porting or modifying existing X code 520, developing a cross-compiler and cross-linker and cross-compiling and cross-linking 522 new Y source code 524, or recompiling and relinking 526 existing X source code 520A.

Developed Y code and related X code and code for the multi-code processing system are combined into a mixed code image and loaded into the X machine as indicated by block 530. The X operating system 509 and support routines 511 are separately loaded into the X machine to support operation of the multi-code processing system.

To produce a debugged Y program that is translated 518 from existing X code, for example, a module of Y code may be loaded with the balance of the program modules loaded as X code. Once the first Y module is debugged, another Y module can be loaded in place of the corresponding X module for debugging. A phased debugging process may thus be practiced to facilitate overall debugging since a relatively narrow portion of the total code is involved in debugging during each debugging run.

Although operating systems characteristically function with elevated privileges, Y operating system modules can be input to the mixed code executing environment from block 516 for debugging processing. Support Y routines that function with elevated privileges can be similarly input from block 516. Higher privilege operating levels are significant because changes in machine state and/or system data structures made at such levels may be erroneous and crash the whole system.

With use of system 10 (FIG. 4), described more fully subsequently herein, and in other multi-code execution and debugging applications referenced herein, jacketing is employed when executing domains are switched. Jacketing provides interfacing for calls between domains that have different calling standards.

Generally, a globally accessible data system is employed and, on the Y side, most data referencing for most software being tested is done without encountering privileged memory locations. When a privileged reference is encountered, a generated access exception is switched to the X side for handling and return.

If an operating system or other "privileged code" module is being executed, and a point is reached that operating system data structures must be updated to continue useful debugging, the user may intercept such updates and manually check them before permitting the process to continue.

Alternatively, a privileged code module may be exercised with driver and test environment code that makes the privileged code module work without the need for privileges. In addition, mixed software development subprocesses may also be employed to advantage in some cases.

For example, a combination of module checking by whole machine simulation and by mixed code checking can be employed according to which checking procedure provides the best advantage in the progressive phases of the development of privileged code software modules. Accordingly, the conventional whole machine approach may be best used for the lowest levels of privileged operating system code that directly controls the hardware. Other code parts may then be best debugged, at least in part, by checking in a mixed code environment. Final debugging may then be performed by the whole-simulator procedure and/or by prototype testing when the prototype becomes available. Generally, all kinds of mixed-procedure variations are possible in applying the principles of the present invention.

However, the greatest value or investment return may usually be obtained from use of the invention in applications involving the development of user level software. With this usage, added value is realized from the amount of development speedups realized, the greater volume of software to be developed, and the facility of the invention usage.

It is noteworthy that during the parallel development of Y software and Y computer system hardware, substantial third party interfacing may occur as indicated by block 532. As a result, there is avoided much of the third party interfacing time that would otherwise be required under prior art practices serially after development of the Y prototype 506.

The parallel software development process is performed for each program that the user desires to develop for the ultimate Y hardware. All of the developed Y software is then available in substantially debugged form as indicated by block 534. When the Y prototype with its operating system becomes available, final code testing and debugging can be performed on the prototype 506 to correct what few, if any, errors still exist in the essentially debugged software.

Subsequently, if desired, the described multi-code processing may continue to be employed for Y software testing and debugging as indicated by flow line 536. Otherwise, any remaining Y user-level program, operating system, or support routines development can be performed by conventional testing and debugging processes on the prototype 506 as indicated by block 538.

Generally, the invention is applicable to new and native architectures that are different, but implementation of the invention is facilitated if user-level functioning is identical or closely similar in the two architectures. More detailed description of a multi-code processing system employable in the invention process described herein is set forth in the cross-referenced application Ser. No. 07/666,039 and other cross-referenced applications.

Figure 3:
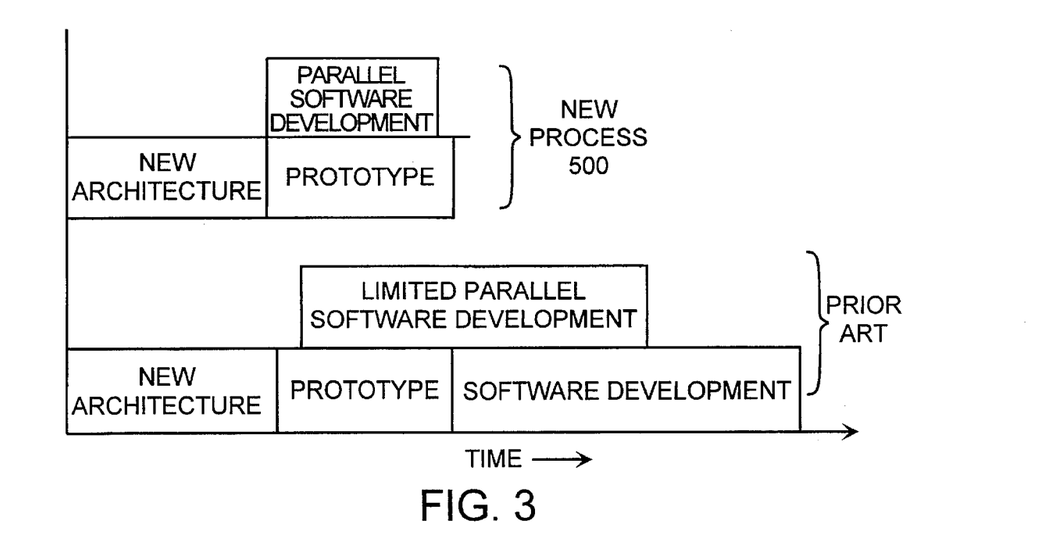
FIG. 3 shows a comparative diagram of the system development time for a development process embodied in accordance with the present invention relative to the system development time for typical prior art system development procedures.

In FIG. 3, there is shown a comparison of the computer system development time achievable by the process 500 in accordance with the present invention and the computer system development time required by typical prior art processes. The illustration is intended to show qualitatively the speedup improvement achieved in system development with use of the present invention as opposed to conventional prior art procedures.

Many factors influence software and hardware development time and it is therefore difficult to generalize as to how much speedup can be achieved in various kinds of cases. However, a speedup factor of at least two can be expected for many if not most system development cases. With even more aggressive application of the methodology of the present invention through use of the developer's resources not otherwise needed for current product engineering demands, even greater speedup factors can be realized.

Figure 4:
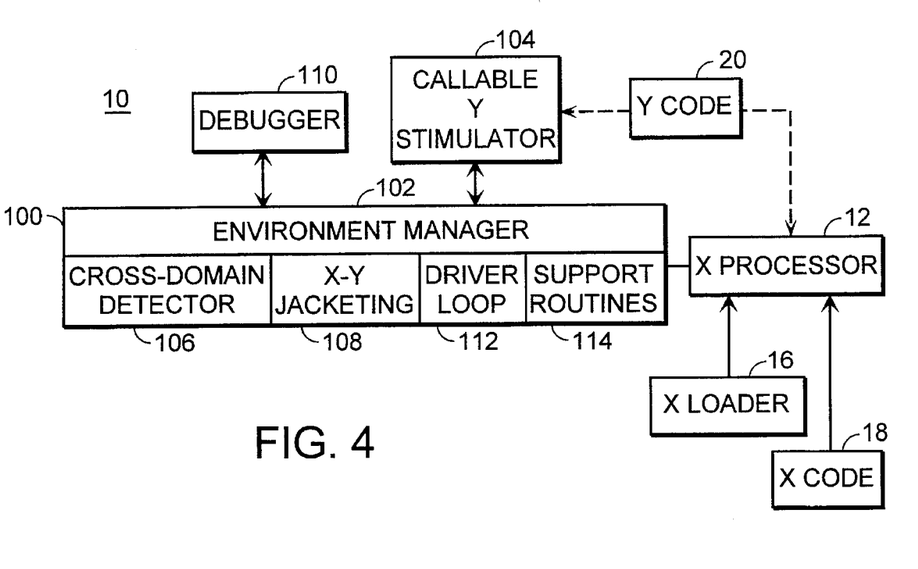
FIG. 4 shows a functional block diagram of a multi-code execution and debugging system that may be employed in implementing the new process of FIG. 1 in accordance with the invention.
Figure 5:
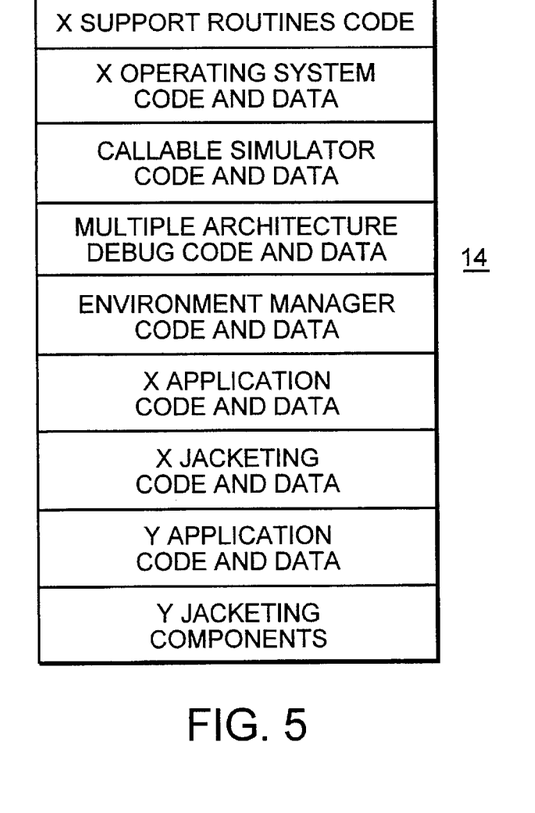
FIG. 5 shows a diagram representing a general program memory layout for the multi-code system of FIG. 4.

More particularly, there is shown in FIG. 4 a system 10 that is arranged to execute and debug multiple codes in a multi-architecture environment. An X processor 12 forms a part of a real X architecture that provides for the execution of multiple codes including X code.

Generally, the system 10 can be operated to process and execute multiple codes, but in the preferred embodiment, the system 10 is structured for executing up to two codes: the X code and another code designated as Y code. The system 10 may directly execute a new user level or other level program compiled in or translated to the Y code, and in doing so, make use of X operating system and support software.

As an example of a commercial application of the system 10 for translated X program code, the X code may be a complex instruction set code (CISC) for which a hardware implementation exists, and the Y code may be a reduced instruction set code (RISC) for which no real RISC hardware exists. A typical CISC system is the X computer system manufactured by the assignee of the present application. Reference is made to the cross-referenced applications Ser. Nos. 07/666,071 and 07/666,025 which are related to CISC-to-RISC translation systems.

The system 10 further includes a memory system 14 having a general layout for program and data components as shown in FIG. 4. An X loader 16 provides for program code entry into the memory system 14 as more fully described in the cross-referenced application Ser. No. 07/666,039.

FIG. 4 shows the architecture of a software system 100 which can be executed by the system 10. A callable simulator 104 functions as part of software system 100 (FIG. 4) within a second architecture (domain), which is preferably a Y architecture embodied in the X hardware. The simulator 104 is structured to emulate Y hardware on the X hardware that may be under development and unavailable. Generally, the simulator 104 executes Y instructions on call from X code through an environment manager 102. Calls may also be made from the Y code through the environment manager 102 for X code execution. For example, the Y code may represent a user level application program and may call for execution of a routine that is located in an X library or it may make a call requiring operating system processing in the X domain. For a detailed description of the structure and operation of the simulator 104, reference is made to the cross-referenced application Ser. No. 07/666,022.

A debugging capability need not be included in the system 10 where system operation is limited to multi-code execution. However, debugging is provided where the system 10 is to be used for code testing.

A debugger system 110 provides for debugging operations within the Y domain under control of the environment manager 102. In its total operation, the debugger system 110 provides the user with control over the execution of code in either domain so that the whole execution process may be examined and modified to correct malfunctions. Generally, the debugger system, provides the procedures needed for debugging operations such as setting breakpoints in both the X and Y domains. The debugger system 110 is structured for interaction with the callable simulator 104 within the system 100. Reference is made to the cross-referenced application Ser. No. 07/666,888 for a detailed description of the structure and operation of the debugger 110.

A cross-domain detector system 106 is employed by the environment manager 102 to determine when a cross-domain call is made during the execution of either the X code or the Y code. An X-Y jacketing system 108 operates within the environment manager system 102 to provide the X and Y executable instruction interfacing needed to implement cross-domain calls between routines. Reference is made to applications Ser. Nos. 07/666,072 and 07/665,752 for more detailed disclosure of the detector and jacketing systems 106 and 108.

The environment manager 102 exercises supervisory control over the callable simulator 104 and the debugger 110 through the execution of a driver loop 112. Support routines 114 provide various services, especially on request from the debugger 110.

With use of the code translation system and method disclosed in the cross-referenced applications Ser. Nos. 07/666,071 and 07/666,025, CISC user level and other X programs can be translated to functionally equivalent RISC Y programs which can be executed on real CISC X hardware by the system 10 for testing and debugging purposes even though operable RISC Y hardware is unavailable.

Advantageously, an X program can be partially translated to Y program code, or a new program can be partially written in Y code for execution with supporting or other X program code, and the mixed X-Y program code can be executed by the system 10 for testing and debugging of both the X and Y codes. The Y code is executed, tested and debugged on the simulated architecture and the remaining X code is executed, tested and debugged on the native architecture. With successful testing of the existing Y code, additional segments of X code can be translated for stepped Y code testing and debugging until the X code is fully translated and the Y code testing and debugging is completed. With the use of progressively stepped testing and debugging, the entire testing and debugging process is facilitated.

Overall, a program can be executed and tested for the Y architecture by translating or compiling it into Y code and running the Y code on the callable system simulator with the run-time environment for the Y code being provided by the operating system and run-time libraries executing on the X or native hardware architecture that is included in the multi-architecture system. The composite software thus includes X and Y codes that are properly executed on the combined X (real) and Y (simulated) architectures. In the preferred embodiment described herein, the operating system for the composite software system is structurally included in the X architecture.

The code boundary between the real and simulated architectures is generally open to the system user's needs. For example, the code boundary can be between the program being ported and the X operating system or, as indicated above, it can even be within the program being ported.

The software system 100 generally has application to widely different architectures. The system 100 also has application to architecture-implementation systems that have different operating systems and different calling systems, but such application is facilitated if the architecture-implementation systems have similar operating systems and similar calling standards. Reference is made to the cross-referenced application Ser. No. 07/665,752 for additional background information on calling systems and differences among them.

DRIVER LOOP

Figure 8:
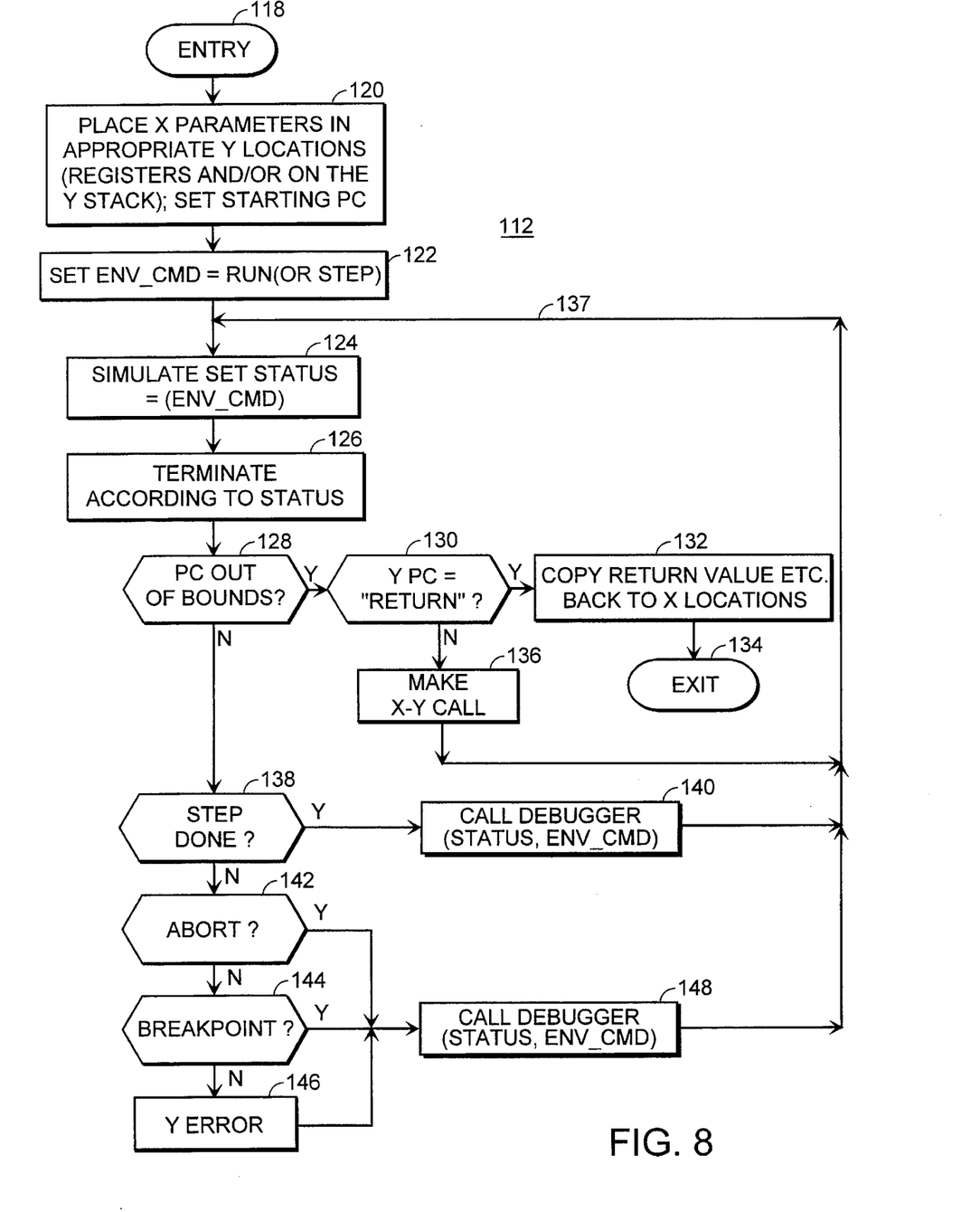
FIG. 8 shows a flow diagram of a driver loop which may be employed by the invention.

In FIG. 8, there is shown a flow chart for the driver loop 112 which drives the simulation/debugging operation. Entry is made to the loop 112 at block 118 when a call is made from X code, often from X application code for execution of a Y routine through the jacketing system 108. Jacketing provides interfacing between the X and Y codes to adjust for calling standard differences.

In block 120, parameters are set up as part of the jacketing process, and in particular X parameters are placed in appropriate Y locations for use during Y code execution. Thus, for normally jacketed routine calls, jacketing tables are referenced in the jacketing system 108 to determine where parameters come from in the X domain and where the corresponding values must be placed in the Y domain. For auto-jacketed routine calls, standard call rules are embedded in special code for this purpose in the jacketing system 108. More detail on jacketing for domain interface purposes is set forth in the cross-referenced application Ser. No. 07/065,752.

A special or distinguished return address is placed in the standard return-address register. The distinguished return address is outside the address bounds previously established as containing Y code. It must also be different from an address that might be used to encode a Y-X call.

In functional block 122, a string variable named ENV_CMD is set by default to RUN mode (continuous instruction execution) or it may be set to STEP mode (instruction-by-instruction execution) by a user selection from the debugger system 110. For example, the user may decide to perform maintenance on the particular Y routine that has been called by an X code routine, and accordingly may make a STEP mode selection for the Y domain.

The simulator 104 is called by block 124 to simulate the Y machine in accordance with the selected mode and the current Y machine state. One or more Y instructions are then executed in the Y domain by the X hardware.

Block 126 next provides for driver loop termination and return according to detected conditions returned from the simulator 104 after its operation has terminated. If the Y program counter is determined to be out of bounds previously established as containing Y code and data, as indicated by block 126, a test block 130 determines whether the Y program counter is making a return to the caller X program.

If the Y program counter matches the distinguished return address in the block 130, execution of the Y routine has been completed and a return is made to the X caller. Block 132 then provides jacketing services, i.e., it copies values as appropriate from the Y result register(s) to the X domain. Normally jacketed calls are processed with the jacketing tables used to initiate the original call. The previously referenced special jacketing code is used for auto-jacketed calls. Simulation is complete at this point as indicated by exit block 134.

If the test block 130 determines that the Y program counter corresponds to a jacketing table entry and does not match the distinguished return address, a call is being made for execution of an X routine within the current execution process in the Y domain, assuming there is no programming error. Block 136 then provides jacketing services by initiating a Y-X call. Jacketing system 108 accesses the jacketing tables to obtain the information needed to copy parameters from the Y-domain to the X domain, the address of the X routine being called, etc. When a return is made to the block 136 from the called X routine, the return value is copied into the Y domain and simulation is resumed as indicated by path 137.

With reference again to block 126, if the STEP mode had been requested and the simulation termination is accordingly determined to be a case called "Step Done," as indicated by block 138, functional block 140 calls the debugger system 110 to indicate completion of the requested step operation and pass the previously returned status and the variable ENV_CMD. A return to the simulator enables resumed simulation without requiring direct simulator recall by the debugger system 110.

The debugger system 110 interprets the status and may make a report to the user. Additional simulator step operations may be requested by the debugger 110 in accordance with a previously established internal script or by user selection. The driver variable ENV_CMD is set to RUN or STEP according to debugger requests.

The debugger 110 calls the environment manager 102 to perform other inquiry and status control functions such as set BREAKPOINT, as more fully considered in the cross-referenced application Ser. No. 07/665,888. In the present embodiment, simulation is controlled only by the driver 112.

If the simulation termination is due to an abort 142, a breakpoint 144, or Y errors 146, block 148 calls the debugger system 110 and operates in the manner described for the block 140.

PROCESS FOR CREATING OPERATIONAL PROGRAM SYSTEM

Figure 6:
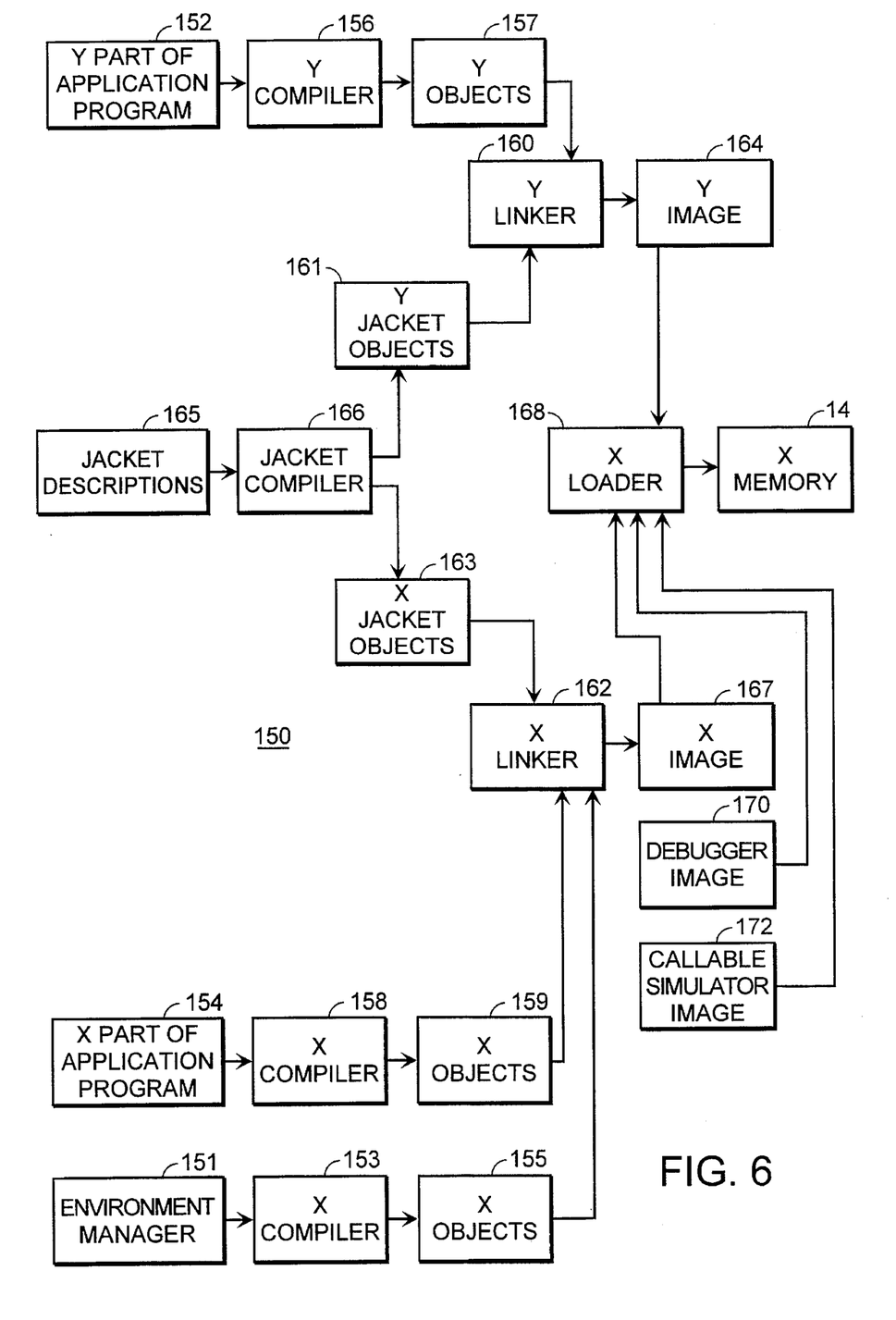
FIG. 6 shows a functional block diagram representing a process by which programs are created for the multi-code system of FIG. 4.

A functional block diagram in FIG. 6 represents a process 150 employed in the preferred embodiment of the invention to create the system of programs that are stored in the memory 14 and operate as component parts of the multi-architecture, multi-code execution and debugging system 10. Although the system user may generally enter programs of any level for debugging or other execution, an application program at the user level is employed in the process 150 as the application program to be entered into the system 10 since it clearly illustrates the operation and advantages of the present invention.

As indicated, the application program to be entered is divided into a Y program part 152 and an X program part 154. For example, in migrating an existing X user level program to the Y architecture well in advance of the availability of Y hardware and its operating system, a modular or other part of the X program may be translated to Y code that forms the Y program part 152. After the two program parts 152 and 154 are entered into the system 10, debugging can be performed on the Y program part 152.

Subsequently, an additional modular part of the X program can be compiled to a new Y program part which is then entered with the debugged Y program part and the remaining X program part for debugging of the new Y program part. This modular or phased debugging process makes debugging more manageable and more convenient for several reasons including the fact that the full functionality of the final image is available to the ported Y module 152. The phased process is continued until the entire X program is converted to an equivalent debugged Y program.

In addition to enabling advance debugging as previously described, the present invention greatly facilitates the debugging process itself. Generally, user level code for the X and Y and, if desired, other architectures may be freely intermixed for execution and debugging by systems embodied in accordance with the invention.

The Y application program part 152, which may include multiple source files corresponding to respective routines or subprograms, is processed by a Y cross compiler 156 to produce one or more Y object files 157. Similarly, an X compiler 158 processes the X program part 154 to produce an X object image 159 having multiple X object files.

A cross linker program 160 combines Y object files by providing cross file linkages between calling and called Y object files (routines) in accordance with applicable calling conventions for the Y architecture. An X linker program 162 similarly combines X object files.

Since Y object files (routines) may make cross domain calls for execution of X object files (routines), and vice-versa, an X-Y call interface is integrated with the Y object files and the X object files respectively by the linkers 160 and 162 thereby facilitating cross-domain execution switching at run time. Specifically, Y jacket object files 161 and X jacket object files 163 are respectively linked with the Y object files and the X object files by the linkers 160 and 162.

In the present embodiment, source code 151 for the environment manager 102 is compiled at 153 to generate X object files 155. The X linker 162 also links the environment manager object files 155 with other object files in producing a combined X image 167.

The Y cross linker 160 combines Y object files together into a single image. A Y image is generated by the Y linker that contains Y code but is externally formatted as a standard shareable X image.

In the preferred embodiment, a global data system is employed so that each code X or Y can generally access all data. However, protected locations may require special processing for cross-domain access from the Y domain.

To build the call interface, jacket descriptions 165 are prepared by the user for each X and Y routine on the basis of knowledge of the applicable X and Y call conventions. In the preferred embodiment, a pair of jacket descriptions is prepared for each routine: one that applies to the calling domain and one that applies to the called domain.

A jacket compiler 166 processes the jacket descriptions to build jacketing tables which can be interpreted by other software at run-time to effect jacketing operations needed for cross-domain execution. A more complete description of jacketing and cross-domain call detection is provided in the cross-referenced applications Ser. No. 07/666,072 and 07/665,752.

An X loader or image activator 168 links the Y image 164, the X image 167, an image 170 for the debugger 110 and an image 172 for the simulator 104. The output from the X loader 168 that is loaded into the X memory 14 and formed into executable code.

SYSTEM OPERATION

A mixed or multi-architecture run-time environment exists at run-time for the system 10 (FIG. 4) as a result of the loading operation just described. In the multi-architecture environment, Y code under test is able to call out to X code for convenient use and full speed execution of available facilities and services that are operational and not under test.

The loaded Y image contains all of the binary Y code to be simulated and that has no external references to other images and no run-time fix-ups. Additional Y code supports the Y environment to facilitate access to every callable routine in the Y image, to compute the address of a target routine at run-time, to provide a Y hardware context block for the simulator 104 (FIG. 4), to provide control over indirect calls from the Y domain, and to provide proper delivery of Y exceptions after formatting in the X domain.

A simulator image provides the callable simulator 104 which interprets binary code in the Y image as Y instructions for execution in the Y hardware context block. Once the simulator 104 is invoked to commence simulation, execution of Y instructions continues until the simulator 104 can proceed no further. Apart from exception conditions, instruction execution normally stops when the simulator 104 generates a target instruction address outside the predetermined Y code range.

The loaded X image includes user program modules, i.e., code from an application that the user has chosen to keep in X code rather than have it ported to Y code. Jacketing data tables, compiled as previously described, provide data used at run-time to enable routines in one domain to call routines in the other domain. The tables also enable data references from Y code to be intercepted for processing, such as to access protected data in the X domain for use in the Y domain.

In addition, the loaded X image includes Y routine entry points, i.e., jacketing routines are provided for X to Y calls and Y to X calls. Transferred data includes input and output parameters and completion status values for return from the called domain to the calling domain. An X to Y call invokes operation of the callable simulator 104 for reception of the jacketed data.

A debugger image provides for operation of the debugger system 110. It functions in both or either of the X and Y environments. For example, it interprets both X and Y instructions and sets breakpoints in the Y code. If desired, the debugger can be deactivated or excluded where the system is used only for execution of mixed code without debugging.

To start the system 10 for operation, a suitable stub startup program is provided in X code in the preferred embodiment. X code execution continues if the next code module contains X code. Otherwise, the next code module contains Y code and the cross-domain detector 106 identifies the need to switch execution from the X domain to the Y domain. If no X application code is provided in a particular use, the system 10 is directly switched to Y code execution and cross-domain calls from the Y code could then be made for execution of X support routines.

Figure 7:
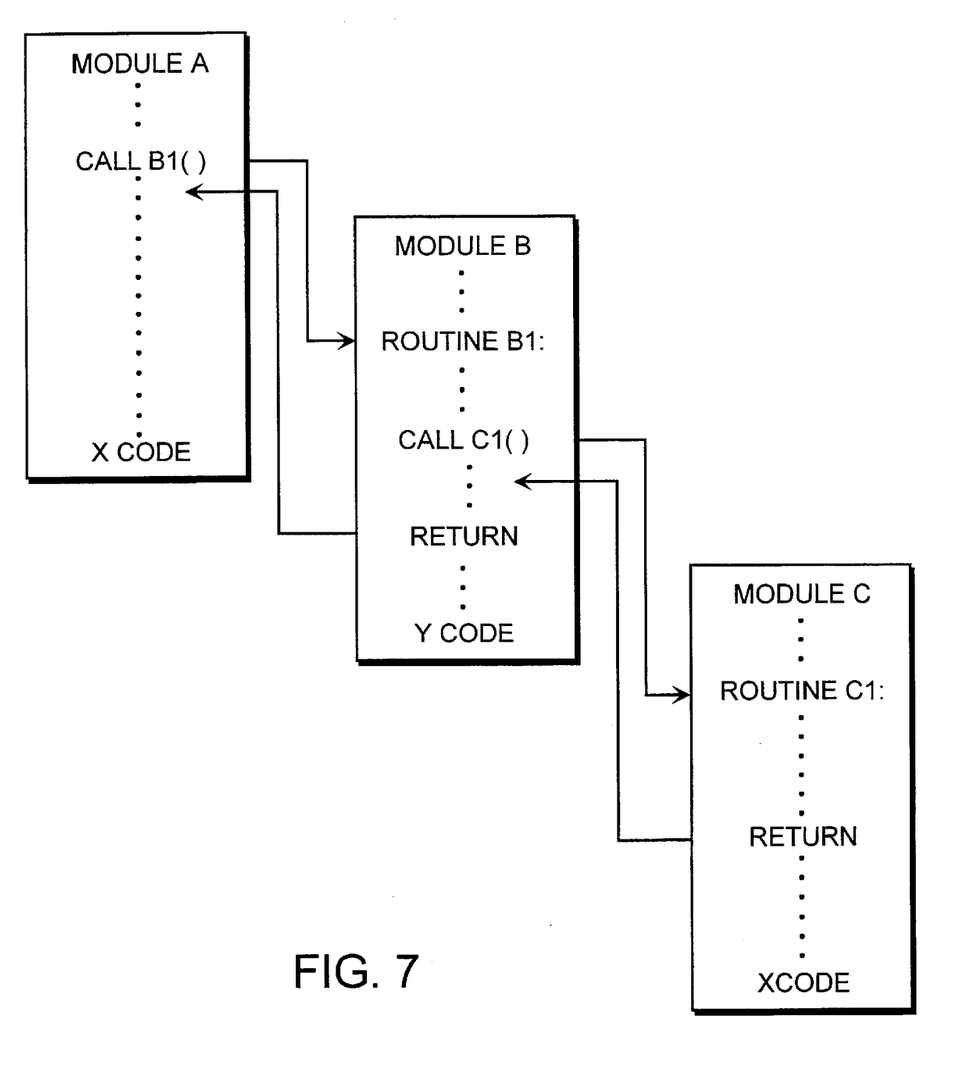
FIG. 7 shows a diagram illustrating cross-domain switching operation of the system of FIG. 4.

In FIG. 7, there is shown a diagram illustrating the switching operations for mixed code execution. Thus, a sample multi-code program includes three modules each containing a number of routines. In module A, an X code routine A1 calls a Y code routine B1 in module B. An execution switch is made to the Y domain and, in the course of execution, the routine B1 calls another X code routine C1 in a module C. With execution control switched across domains to the module C, X code execution continues to the termination of the routine C1.

A domain switch is then made by a return back to the Y routine B1. The routine B1 completes and a cross-domain return is made to the original caller A1.

Various modifications and variations can be made in the faster process for developing new computer systems employing new and better procedures for software development and testing of the present invention by those skilled in the pertaining art without departing from the scope and spirit of the invention. It is accordingly intended that the present invention embrace such modifications and variations to the extent they come within the scope of the appended claims and their equivalents.

What is claimed is:

1. An apparatus for testing programs for a new computer system based on a new (Y) architecture comprising:

a multi-code processing system including an existing X computer system designed in accordance with an X architecture and having an operative X operating system and operative X support routines, said multi-code processing system further including a Y architecture simulator program and an environment manager program to control and interface the switching of code execution between direct execution on said X computer system and execution on said Y architecture simulator;

a Y code module designed in accordance with said Y architecture;

means for converting said Y code module for operation on said multicode processing system by combining said Y code module with related X code to form a mixed-code image;

means, within said multi-code processing system, for executing said mixed-code image to test and debug said Y code module.

2. The apparatus of claim 1 further comprising means for executing the debugged Y code modules on a Y computer hardware prototype after said Y prototype is developed.

3. The apparatus of claim 2 wherein said multi-code execution system further includes a debugger component to enable testing and debugging of said Y code module.

4. The apparatus of claim 3 wherein said debugger, Y simulator and environment manager test X code modules and Y code modules together.

5. The apparatus of claim 3 wherein said Y computer hardware prototype further includes a prototype Y operating system.

6. The apparatus of claim 5 wherein said Y code module includes at least a portion of the Y operating system code.

7. The apparatus of claim 1, wherein said Y code module is an application program.

8. The apparatus of claim 7 wherein said multi-code processing system executes X support routines when called by said Y module.

9. The apparatus of claim 8 wherein the user level functions of said X and Y application programs are similar or identical.

10. The apparatus of claim 1, wherein said means for converting further combines said Y code module with a second Y code module after said step of executing said mixed-code image to test and debug said Y code module, and forms a combined Y code module as a result, and wherein said means for executing further executes said combined Y code module on said multi-code processing system to test and debug said combined Y code module.

11. The apparatus of claim 1, wherein said X architecture computer system is a Complex Instruction Set Code architecture, and said Y architecture is a Reduced Instruction Set Code architecture.

12. The apparatus of claim 1 further comprising means for successively replacing said Y code module with other Y code modules in order to test and debug a complete Y program.

13. The apparatus of claim 1, wherein said means for converting further comprises:

a Y-cross compiler for cross-compiling said Y code modules to form corresponding Y object files;

a jacket-compiler for compiling jacket descriptions specifying interfaces corresponding to said Y code modules to form jacketing tables; and a cross-linker for cross-linking said Y object files to form a Y image which is combined with a related X image to form said mixed-code image.

14. A computer implemented process for testing a Y code module designed in accordance with a new computer system based on a new (Y) architecture comprising the steps of:

converting said Y code module by combining said Y code module with related X code to form a mixed-code image;

executing said mixed-code image on a multicode execution system to test and debug said Y code module, said mixed code execution system including an existing X computer system designed in accordance with an X architecture and having an operative X operating system and operative X support routines, said multi-code processing system further including a Y architecture simulator program and an environment manager program to control and interface the switching of code execution between direct execution on said X computer system and execution on said Y architecture simulator.

15. A computer implemented process for testing programs for a new computer system based on a new (Y) architecture, comprising the steps of:

converting a Y code module designed in accordance with said Y architecture for operation on a multicode processing system by combining said Y code module with related X code to form a mixed-code image, said multicode processing system including an existing X computer system designed in accordance with an X architecture and having an operative X operating system and operative X support routines, said multi-code processing system further including a Y architecture simulator program and an environment manager program to control and interface the switching of code execution between direct execution on said X computer system and execution on said Y architecture simulator; and executing said mixed-code image on said multi-code processing system to test and debug said Y code module.

16. The computer implemented process of claim 15, wherein said converting further comprises:

cross-compiling said Y code modules on a Y-cross compiler to form corresponding Y object files;

compiling jacket descriptions specifying interfaces corresponding to said Y code modules to form jacketing tables; and a cross-linker for cross-linking said Y object to form a Y image which is combined with a related X image to form said mixed-code image.

* * * * *